United States Patent [19]

Taguchi

[11] Patent Number: 4,868,643
[45] Date of Patent: Sep. 19, 1989

[54] COLOR IMAGE INFORMATION TRANSMITTING AND RECEIVING SYSTEM WITH COLOR IMAGE SIGNALS INCLUDING START SIGNALS FOR SYNCHRONIZING STORAGE

[75] Inventor: Tomishige Taguchi, Saitama, Japan

[73] Assignee: Canon Kabushiki Kaisha, Tokyo, Japan

[21] Appl. No.: 274,657

[22] Filed: Nov. 21, 1988

Related U.S. Application Data

[63] Continuation of Ser. No. 892,583, Aug. 1, 1986, abandoned.

[30] Foreign Application Priority Data

Aug. 2, 1985 [JP] Japan .................. 60-170823

[51] Int. Cl.$^4$ .................. H04N 1/46; H04N 1/21
[52] U.S. Cl. .................. 358/78; 358/75
[58] Field of Search .................. 358/75, 78, 80

[56] References Cited

U.S. PATENT DOCUMENTS

| | | | |
|---|---|---|---|
| 4,393,399 | 7/1983 | Gast et al. | 358/80 |
| 4,713,684 | 12/1987 | Kawamura et al. | 358/75 |

FOREIGN PATENT DOCUMENTS

| | | | |
|---|---|---|---|
| 57-210773 | 12/1982 | Japan | 358/75 |
| 58-1377 | 1/1983 | Japan | 358/75 |
| 59-171260 | 9/1984 | Japan | 358/75 |
| 60-33789 | 2/1985 | Japan | 358/75 |

OTHER PUBLICATIONS

Author unknown, "Digital Color Halftone Reproduction", *IBM Technical Disclosure Bulletin*, vol. 28, No. 1, Jun. 1985, pp. 438–439.

*Primary Examiner*—James J. Groody
*Assistant Examiner*—Randall S. Svihla
*Attorney, Agent, or Firm*—Robin, Blecker, Daley & Driscoll

[57] ABSTRACT

A system for analyzing and reproducing the color information of an original picture is disclosed. A transmitting device is provided with a plurality of frame memories each of which stores a color image signal corresponding to a particular color component of the original. The time axis of the color image signals is changed by controlling the store speeds and the read out speeds of the memories. The color signals are read out and transmitted in a frame-sequential manner. At the time of transmission of each frame, a start signal is added to each color signal for use in the receiver of the system. At the receiver, a storage device is provided. The latter includes a plurality of memories each for storing a different one of the transmitted color signals. The storage device is responsive to the start signals in the color signals and storage in the memories is carried out in response to these start signals. A monitor is also provided at the receiver and the color image signals in the memories are read out in a dot sequential manner for display on the monitor. The start signal may be a combination of signals associated with the maximum and minimum values of the color image signals.

25 Claims, 9 Drawing Sheets

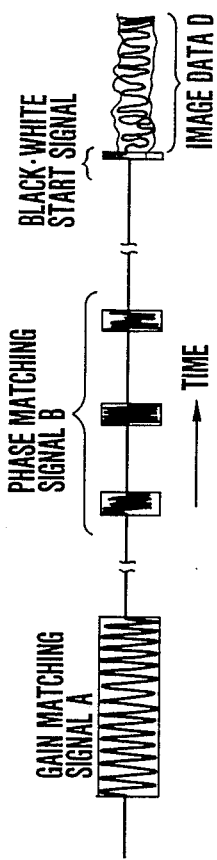
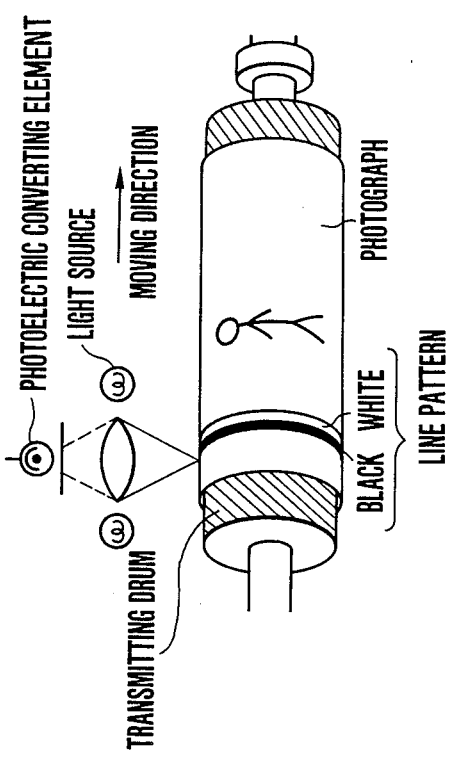

COLOR IMAGE INFORMATION TRANSMITTING AND RECEIVING SYSTEM WITH COLOR IMAGE SIGNALS INCLUDING START SIGNALS FOR SYNCHRONIZING STORAGE

This application is a continuation of application Ser. No. 892,583 filed Aug. 1, 1986, now abandoned.

BACKGROUND OF THE INVENTION

1. Field of the Invention:

The present invention relates to an image information transmitting and receiving system so designed that color information of an original picture obtained by analyzing the original picture into color components as image signals is modulated for example in amplitude or frequency and transmitted in a plane sequence, while at a receiving side the received image signals are stored in a memory.

2. Description of the Related Art:

FIG. 4 shows a conventional system of this kind. In the case of this system, an original picture such as a photograph is wound on a transmitting drum 1 which is driven by a motor 28. To a motor driver 27 for driving the motor 28, a signal, where frequency is divided by a frequency divider 26, is delivered from a crystal oscillator 6. By means of a rotation phase signal detected by a phase sensor 4 a carrier from a carrier generator 7 is modulated by a modulator 5, amplified by an image signal amplifier 10 and delivered to a transmission line 11. At this time, a signal delivered to the transmission line 11 is led to a monitor amplifier 12 to operate a monitor speaker 13.

On the other hand, at a receiving side the modulated signal is led to AGC (automatic, gain control) circuit 23 so as to adjust the output level, while the phase is detected by a phase detector 24 in the next step. A frequency divider 26 is reset by a synchronization signal produced by a phase synchronizer 25 so as to match the rotation phase of a motor 28 at the receiving side with that at the transmitting side.

Then a photoelectric converter 3 at the transmitting side is brought on the most white part of the picture, the carrier is modulated in amplitude or frequency by a modulator 8 by means of the signal photoelectrically converted at the point, amplified by the image signal amplifier 10 and then delivered to the transmission line 11.

When the signal is received at the receiving side, in order to detect and compensate the attenuation characteristics of the transmission line, the amplification degree of an ALS (automatic level sensor) 14 is set at a predetermined value by an ALS control unit 15 and a level comparator 17, while the gain is controlled so as to hold the set level until the image information for one picture has been transmitted. Then, at the transmitting side the photoelectric converter 3 is set at the beginning of the part to be sent out of the picture in such a manner that the electrical signal corresponding to the original picture obtained by successively moving the photoelectrical converter 3 for each rotation of the transmitting drum 1 is sent to the modulator 8, which delivers the modulation signal to be amplified by the image signal amplifier 10 and delivered to the transmission line 11.

When at the receiving side the signal from the transmitting side is received, the signal is adjusted in the level by the ALS 14, delivered to a demodulator 20 via a picture amplitude amplifier 18 and a remodulator 19 so as to be demodulated. This demodulated signal is non-linearly amplified by a gamma compensating portion 21 so as to be matched with the characteristics of the recording medium (in this case the film on the drum) and then amplified by a recording amplifier 22. When this amplified signal is led to a photoelectric converter 30, an image corresponding to this signal is recorded on a film on a receiving drum 29. This film is used to make the print plate.

At the time of the transmission of a color picture, color analyzing filters are provided in front of the photoelectric converter 3 in such a manner that information analyzed in colors by the filters transmitted as the signals corresponding to, for example, cyan, magenta and yellow, while at the receiving side the signals are recorded on the film on the receiving drum 29 for each color. Then, in order to obtain a color photograph, it is necessary to make a printing putting the films for each color thus obtained together. Consequently, by means of the conventional system it is impossible to evaluate the directly transmitted color picture on the spot and observe it on the monitor.

Thus, in order to evaluate the picture on the spot, a transmitting and receiving system by the MODEM transmission as is shown in FIG. 5 is known.

Below, the operation of the system shown in FIG. 5 will be explained. The image information inputted from a camera or scanner are analyzed into red, green and blue by the image input portion 30 and outputted as analog signals. These analog signals R, G and B are converted by an A/D converter 31 at sampling signal intervals from a sample pulse generating circuit 31' into digital signals, and stored in a frame memory 32 for each color information. The contents of the frame memory 32 are always delivered in a video rate to a D/A converter 33 so as to be converted into analog signals to be delivered to a monitor 34.

On the other hand, a central processing unit (CPU) 36 reads out the data for each color stored in the frame memory 32 via an interface 35 and carries out an operation processing. Then, the operation-processed data is modulated by a MODEM modulator 37, amplified by an amplifier 38, transmitted to the receiving side via a transmission line 39. The data received at the receiving side is demodulated by a MODEM demodulator 40 into digital signals to be delivered to a central processing unit (CPU) 42 in the next step. The CPU 42 controls an interface 43 in such a manner that the data for each color is stored in the corresponding R, G and B memories in a frame memory 44. Then, the stored data is always converted by a D/A converter 45 into analog video signals to be delivered to a monitor 46.

As explained above, in the case of the MODEM transmission shown in FIG. 5, it is easy to position the display of the received image for each color by the monitor 46, and the color deviation as is shown in FIG. 6 can be avoided.

On the other hand, in the case of the system as is shown in FIG. 5, in order to carry out the MODEM transmission it is impossible to receive the signals transmitted from the system shown in FIG. 4 and modulated in amplitude or frequency and monitor or to transmit and receive the signals for making the print plate for each color. Namely, the system shown in FIG. 5 is not interchangeable with the system shown in FIG. 4.

SUMMARY OF THE INVENTION

It is, accordingly, a first object of the present invention to provide a transmitting and receiving system in which a signal from the conventional system can be received and observed on a monitor and further an image to be received can be received well.

Further, it is a second object of the present invention to provide a receiving device in which transmitted data can be observed on a monitor and further delivered to the conventional receiving device so as to make a print plate by film.

Further, it is a third object of the present invention to provide a transmitting which transmits an image signal capable of being observed on a monitor at the side of a receiving device and can be interchanged with the conventional receiving device.

To attain these object, according to a preferred embodiment of the present invention, a transmitting and receiving system comprises a transmitting device including means for analyzing an image signal into a plural number of color components, means for transmitting the analyzed signal in a plane sequence and means for adding a start signal for adjusting the position on a monitor to the image signal analyzed in color components at the time of transmission, the transmitting device being interchangeable with the conventional receiving device, and a receiving device including means for delivering the received image signal to the conventional receiving device and means for converting the signal transmitted in a plane sequence into a signal convenient for a monitor display.

Further purposes and features of the present invention will be apparent from explanations to be made below with reference to the accompanying drawings.

BRIEF DESCRIPTION OF THE DRAWINGS

FIG. 2 shows an example of a transmitting wave form of the present invention.

FIG. 3 shows a method according to which a start pattern of the data transmission of the present invention is transmitted by the conventional transmitter.

Detailed Description of the Preferred Embodiment

Figure 1A:
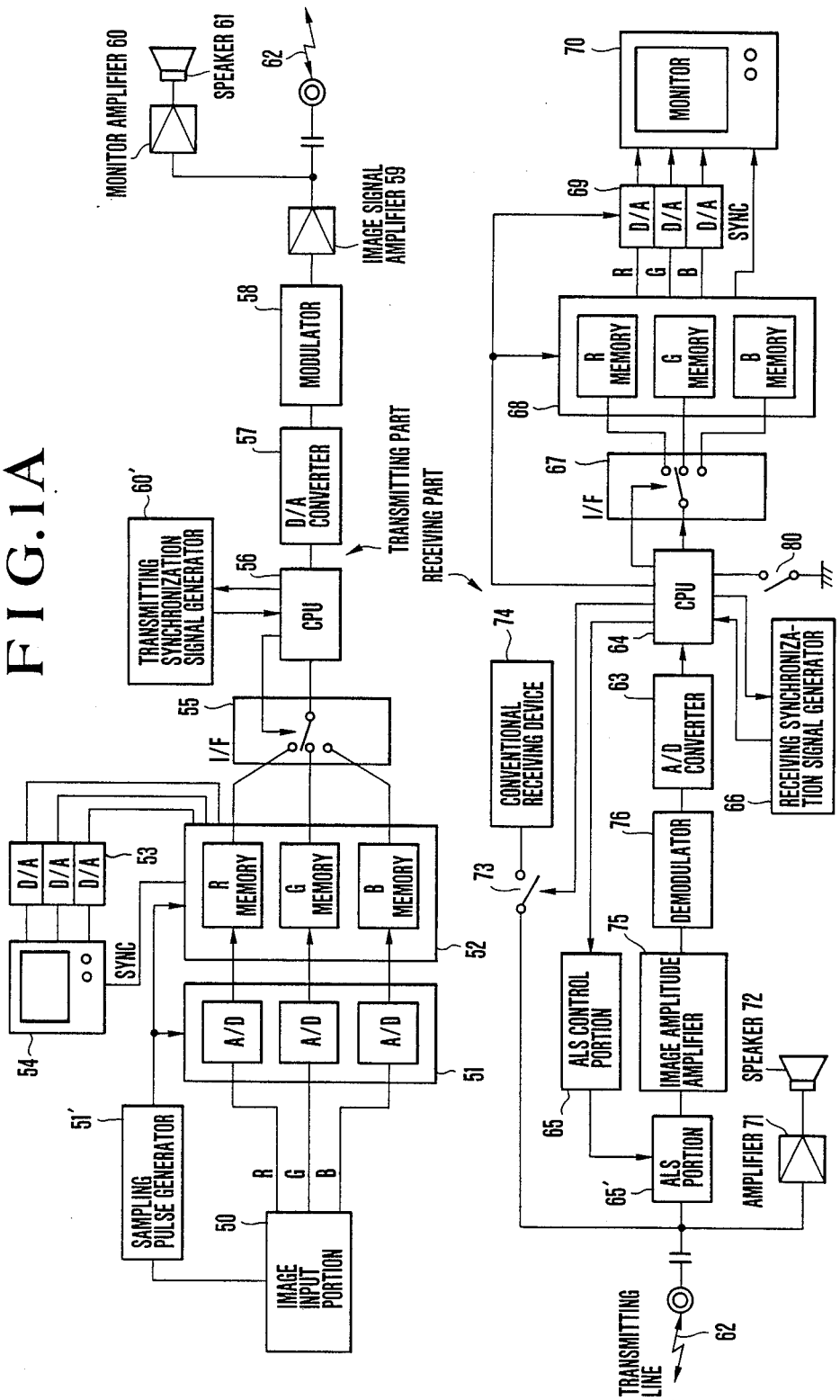
FIG. 1A is a block diagram of an embodiment of the present invention.

FIG. 1A is a block diagram of an embodiment of the present invention. A system of the present embodiment is composed of a transmitting part and a receiving part, each part including the various components to be explained later.

Firstly, the construction of the transmitting part will be explained. In FIG. 1A, 50 is an image input portion which analyzes image information inputted from a camera or scanner into red, green and blue components so as to produce analog signals R, G and B. 51 is an A/D converter which converts the analog signals R, G and B produced by the image input portion 50 into digital signals at the interval of a sampling signal delivered from a sampling pulse generator 51' and stores the A/D converted color information into a frame memory 52. 53 is a D/A converter for D/A converting a signal read out from the frame memory 52 and delivering the converted signal to a monitor 54 for transmission.

56 is a central processing unit (CPU) for storing data for each color of the frame memory 52 via an interface 55 so as to carry out predetermined operation processing. 57 is a D/A converter for D/A converting, for example, data processed by the CPU 56 according to a timing signal from a synchronizing signal generator 60'. The CPU 56 transmits the data plane or frame-sequentially according to the sequence of an R memory, a G memory and a B memory. 58 is a modulator for obtaining a predetermined wave modulated in amplitude or frequency by an output signal from the converter 57. An output signal from the modulator 58 is amplified by an image signal amplifier 59 and sent to a transmitting line 62. Further, 60 is a monitor amplifier, and 61 is a speaker for monitor.

Below, the construction of the receiving part will be explained. 65' is an ALS (automatic level sensing) portion for detecting the attenuation characteristics of the line so as to carry out the compensation, whereby the amplification degree is set by an ALS control portion 65 as will be explained later, and kept until image information for one picture has been transmitted. 75 is an image amplitude amplifier for amplifying a wave sent from the transmitting part and inputted via the ALS portion 65'. 76 is a demodulator for demodulating the signals into the original color signal. The signals demodulated by the demodulator 76 is converted by an A/D converter 63 and delivered to a central processing unit (CPU) 64.

The CPU 64 controls the ALS control portion 65, a receiving synchronization signal generator 66, a switch 73, an interface 67 and so on, in a way as explained later. A memory 68 stores color signals received according to a certain determined timing and demodulated by the CPU 64. A D/A converter 69 converts the color signals R, G and B read out from the memory 68 and delivers these to a receiving monitor 70.

Further, the present embodiment is arranged such that a conventional receiving device 74 connected to the receiving part can be used when the CPU 64 brings the switch 73 into the closed state in order to make a printing plate while observing the monitor 70.

Below, the operation of the above embodiment will be explained with reference to an example of a transmitting wave shown in FIG. 2. Here, the wave shown in FIG. 2 is modulated in amplitude.

At first, image information from a camera or a scanner is analyzed in red, green and blue by the image input portion 50 and outputted as analog signals. The analog signals R, G, B are digitalized by the A/D converter 51 at the sampling interval of the sampling pulse generator 51' and stored in the frame memory 52 for each color information. The content of the frame memory 52 is delivered to the D/A converter 53 always at the video rate so as to be converted. Thus converted analog signals are delivered to the monitor 54.

On the other hand, before the image data stored in the frame memory 52 from the transmitting part is delivered out, signals A–C as is shown in FIG. 2 are produced in sequence and delivered.

Hereby, the signal A is a reference signal to be used by the ALS control portion 65 at the receiving side for setting the amplification degree of the ALS portion 65', whereby the ALS control portion 65 sets the amplification degree of the ALS portion 65' in such a manner that the received signal A is at a certain predetermined level. The amplification degree of the ALS portion 65' once set by this signal A is kept at this level until the image data for one picture has been transmitted. The signal B is a phase matching signal for obtaining the phase synchronization in order to match the phase of the transmitting synchronization signal generator 60' at the transmitting side with that of the receiving synchronization signal generator 66 at the receiving side, whereby one picture is transmitted in the phase thus matched. Further, the signal C is a white and black, or black and white, signal showing the start of the image data of the present invention and continues to be transmitted for a certain determined time.

The production and the delivery timing of these signals A–C is carried out by the CPU 56.

Then, in order to be able to use the conventional receiver, the CPU 56 carries out a predetermined operation processing, reading the data in the frame memory 52 for each color, namely in a plane or frame sequence via the interface 55. Then, thus operation-processed data are converted by the D/A converter 57 in synchronization with the timing signal from the transmitting synchronization signal generator 60' into analog signals, which is delivered to the modulator 58 so as to be modulated in amplitude, amplified by the next image signal amplifier 59 so as to assume a form D shown in FIG. 2 and further delivered to the transmitting line 62. At this time a part of the output of the image signal amplifier 59 is led to the monitor amplifier 60 so as to drive the speaker 61, so that the sound of the transmitted data is monitored by the speaker 61.

Figure 1B:
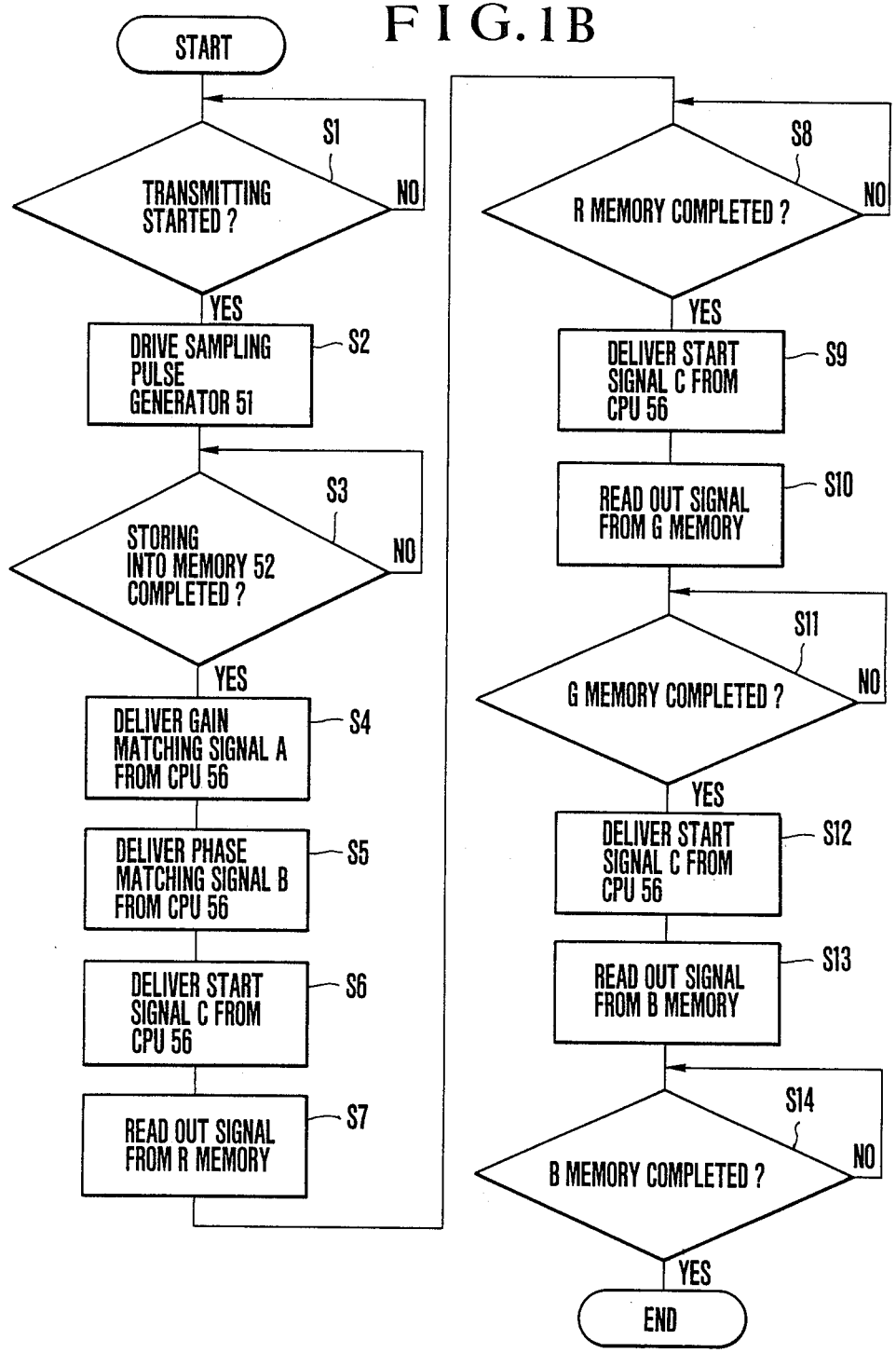
FIGS. 1B, 1C and 1D are flow charts explaining an operation of the embodiment shown in FIG. 1A.

Below, the above operation will be explained with reference to FIG. 1B. FIG. 1B is a flow chart for explaining the operation of an embodiment of the CPU 56 shown in FIG. 1A.

When the transmitting operation is started (S1), the sampling pulse generator 51' is driven (S2) so as to store the image data imputted from the image input portion 50 into the memory 52. After the data has been stored in the memory 52 (S3), the flow is branched from S3 to S4, the gain matching signal A is delivered from the CPU 56 (S4), the phase matching signal B is delivered (S5) and then the start signal C is delivered (S6). Then, the image signal is read out from the R memory of the memory 52 and transmitted (S7). After the signal has been transmitted (S8), the start signal C is delivered from the CPU 56 (S9) and then, the image signal is read out from the B memory from the G memory and transmitted (S10). After the termination of the transmission (S11), the start signal C is delivered in a similar way (S12) and the image signal is read out from the B memory and transmitted (S13).

Figure 1C:
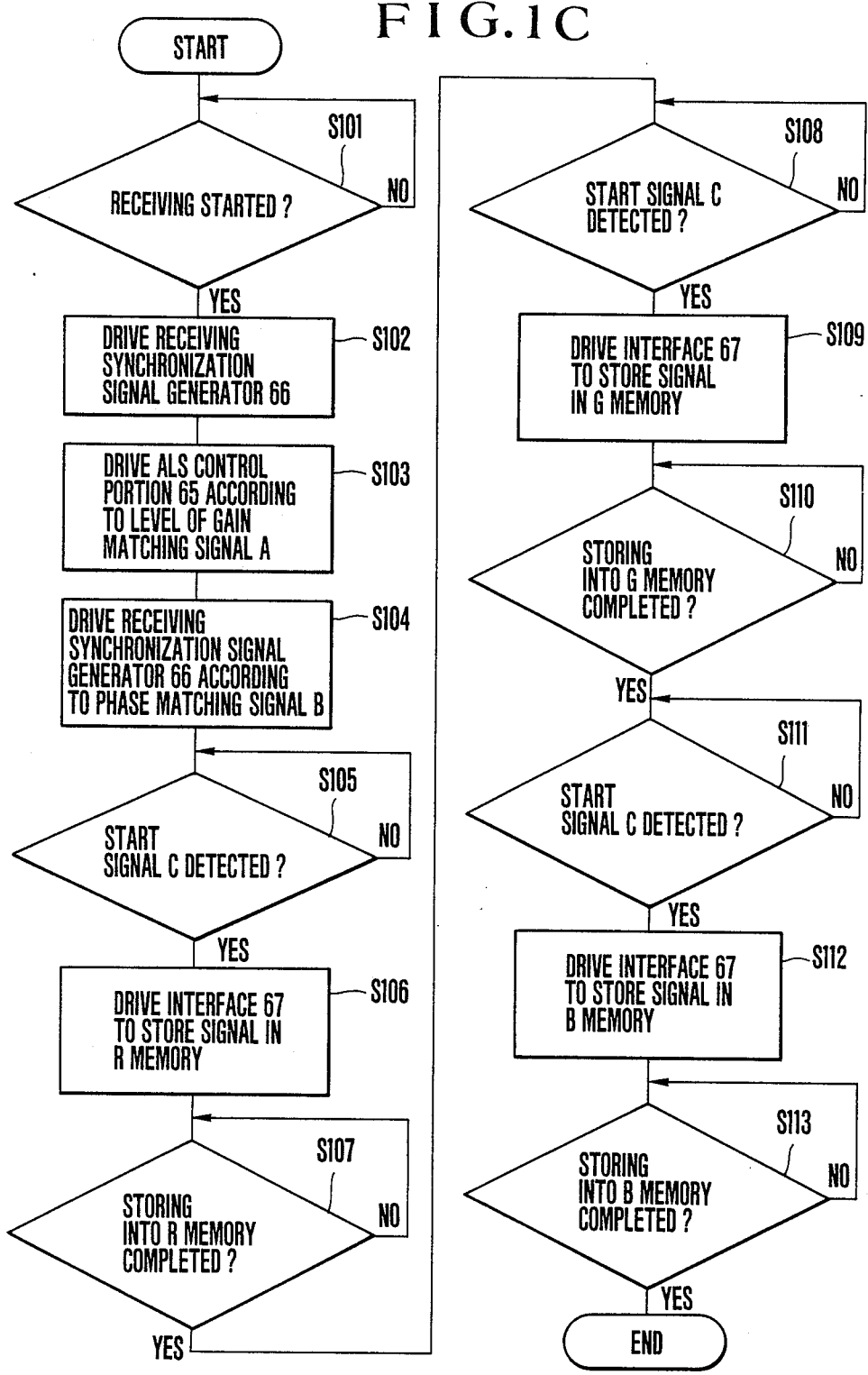
Figure 1D:
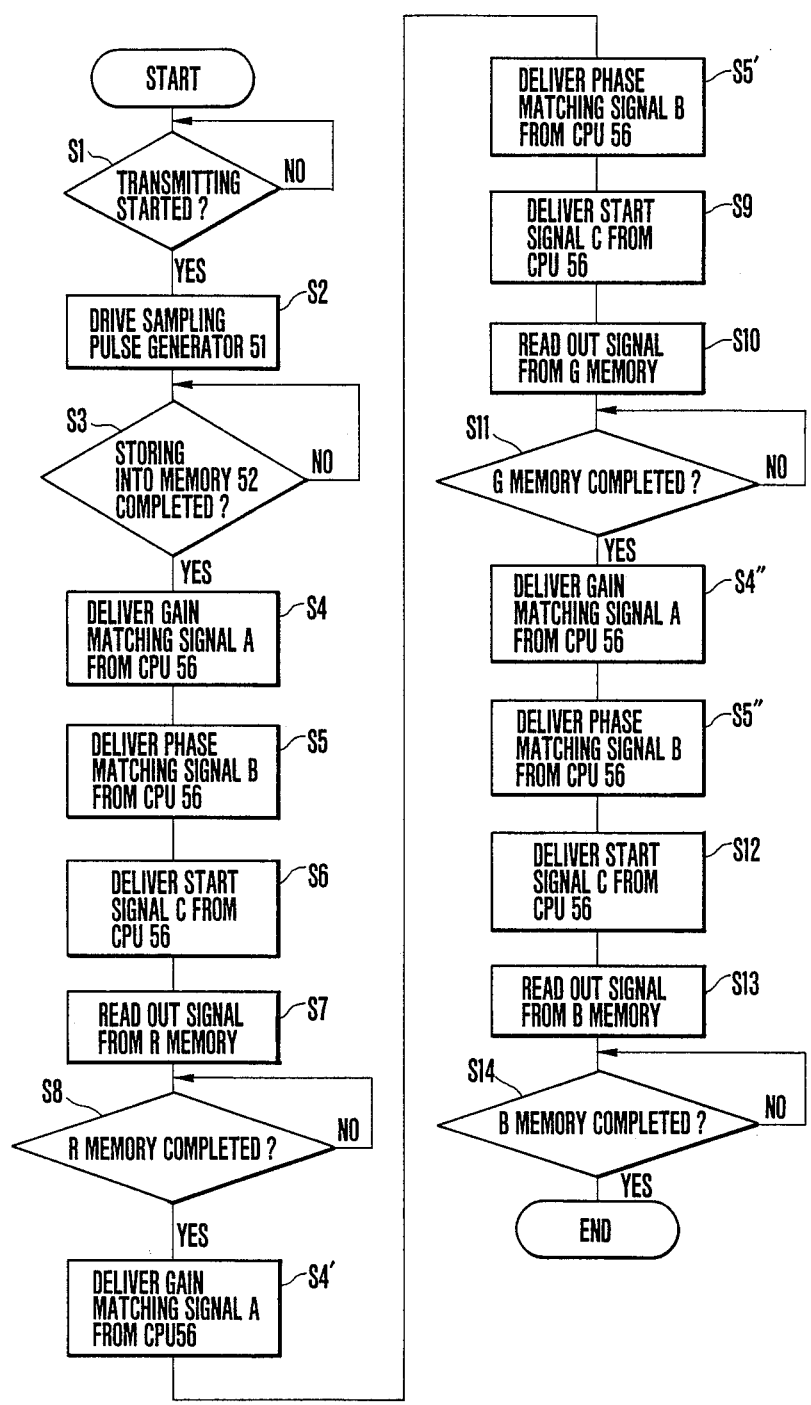

Hereby, in the flow chart shown in FIG. 1B, the gain matching signal A and the phase matching signal B are transmitted at the steps S4 and S5, whereby it is also possible that they are transmitted between the steps S8 and S9, and between the steps S11 and S12 as shown in FIG. 1D.

Below, the operation when such signals are received will be explained.

When the receiving part receives the wave as shown in FIG. 2, the signal is subjected to a predetermined processing at the ALS portion 65', the image amplitude amplifier 75, the demodulator 76 and the A/D converter 63 and are delivered to the CPU 64. When the CPU 64 detects the start signal C, the CPU 64 stores in sequence the following image data D in the memory 68 via the interface 67. Namely, before the start C is received, the CPU 64 does not store the image data in the memory 68.

Figure 6:
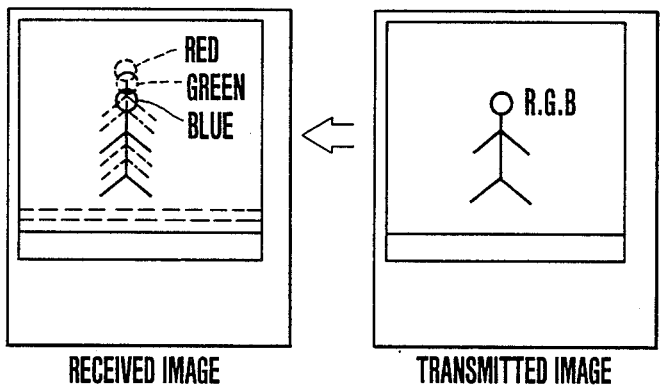
FIG. 6 illustrates the deviation of a received picture displayed on a monitor by using a plane-sequential transmitting method according to the conventional amplitude modulation or frequency modulation system.

The above method is carried out for each color information, whereby when the monitor reproducing switch 80 is closed, the content stored in the memory 68 for each color information are delivered to the D/A converter 69 at the video rate so as to be converted into analog signals, which are delivered to the monitor 70. Further, the analog signals delivered to the monitor 70 are read out not in a plane or frame sequence but in a point sequence, namely in the sequence of R memory, G memory and B memory for 1 picture element on the memory. Namely, it is possible to observe the transmitted image signals on the monitor 70 by reading out the signals of the memory in the system in which the image informations are reproduced at the side of the monitor 70. Although in the case of the present embodiment the signals are read out in a point sequence and directly to the monitor, in the case of the popular television receiver the signals may be converted into the standard television signals such as NTSC by using an encoder and then delivered to the monitor. Further, when in the case of the present embodiment the image data are stored in the memory 68, the start signal added to the image signals at the transmitting side is detected and the image signals are stored in the memory 68 in synchronization therewith, so that the color deviation as is shown in FIG. 6 is impossible. Otherwise, the positions at which the image is stored for each memory deviate so as to cause the color deviation.

Further, when the CPU 64 closes the switch 73, the conventional receiving device 74 becomes operative, so that it is possible to make a printing plate while observing the monitor 70.

Below, the operation at the side of the receiving part will be explained with reference to the flow chart in FIG. 1C. FIG. 1C is a flow chart for explaining the operation of the CPU 64 of the embodiment shown in FIG. 1A.

At the start of the receiving operation the flow advances from S101 to S102, whereby the receiving synchronization signal generator 66 is driven (S102). The ALS control portion 65 is driven according to the level of the gain matching signal A so as to set the gain at the ALS portion 65' (S103). Then the receiving synchronization signal generator 66 is driven so as to be synchronized with the phase matching signal B (S104). Next, the presence of the start signal C is detected (S105). When the start signal C is detected, the interface 67 is driven so as to store the received signals in the R memory (S106). When the signals have been stored the flow is branched from S107 to S108. Then when the start signal C is detected the flow is branched from S108 to S109 and the same steps as shown over S105 - S107 are repeated for the G memory and the B memory so as to terminate the receiving operation.

Figure 7:
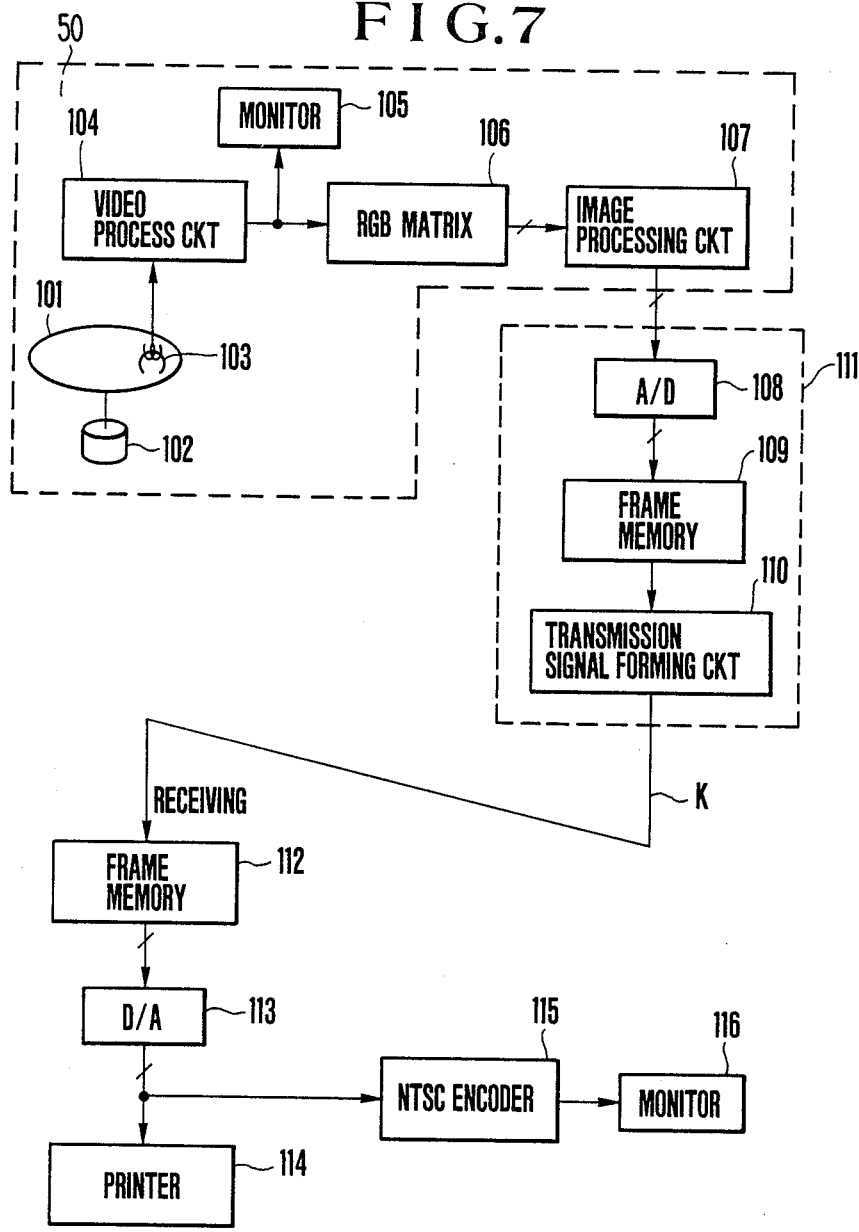
FIG. 7 is a block diagram showing an example of the construction of an image input portion 50 shown in FIG. 1A.

Below the embodiment in which an apparatus for reproducing an image signal recorded on a recording medium such as a rotary magnetic sheet is used as the image input portion 50 will be explained with reference to FIG. 7. FIG. 7 shows a block diagram of the construction of such an apparatus.

In FIG. 7, 101 is a rotary magnetic sheet and 102 is a motor for driving the sheet 101. A reproducing head 103 is arranged on the rotary magnetic sheet 101 so as to reproduce a still picture for one frame. The reproducing signal is inputted to a video process circuit 104 so as to be converted into the form of an NTSC signal, a line-sequential signal or the like. This image signal is displayed on a monitor 105 and inputted into an RGB matrix 106. In the RGB matrix 106 the reproducing image signal is matrix-processed into R, G and B components. Further, these signal components pass the processes such as the color compensation conversion, the γ-compensation, the masking and so on in an image processing circuit 107, whose output is converted by an A/D converter 108 into a digital signal and quantitized for example in 8 bit, namely on the 256 step level. The data for Yl, Mg, Cy are stored in a frame memory 109 in sequence by the operation to be explained later and read out according to the transmission rate of a transmission line. At this time a phase synchronization signal is added to the data in a transmission signal forming circuit 110 in such a manner that the printing can be carried out in the same timing at the receiving side. 111 constitutes a transmitter, which corresponds to the transmitting part shown in FIG. 1A. It is to be noted that the elements 101 to 107 correspond to the image input portion 50 shown in FIG. 1A. Its output is transmitted to the receiving side via a communication line K.

Further, the transmission signal forming circuit 110 includes a modulator and so on for transmitting the data via the communication line K.

The receiving side is similar as is already shown in FIG. 1A, whereby the output of a frame memory 112 is fed to a D/A converter 113 whose output can be delivered not only to a monitor 116 via an NTSC endcoder 115 but also a printer 114.

The Yl signal, the Cy signal and the Mg signal obtained are used to control the exposure amount in the printer 114 in case the light is exposed to the sensitive material for each color component and to control the amount of ink in the case of an ink jet printer.

Figure 4:
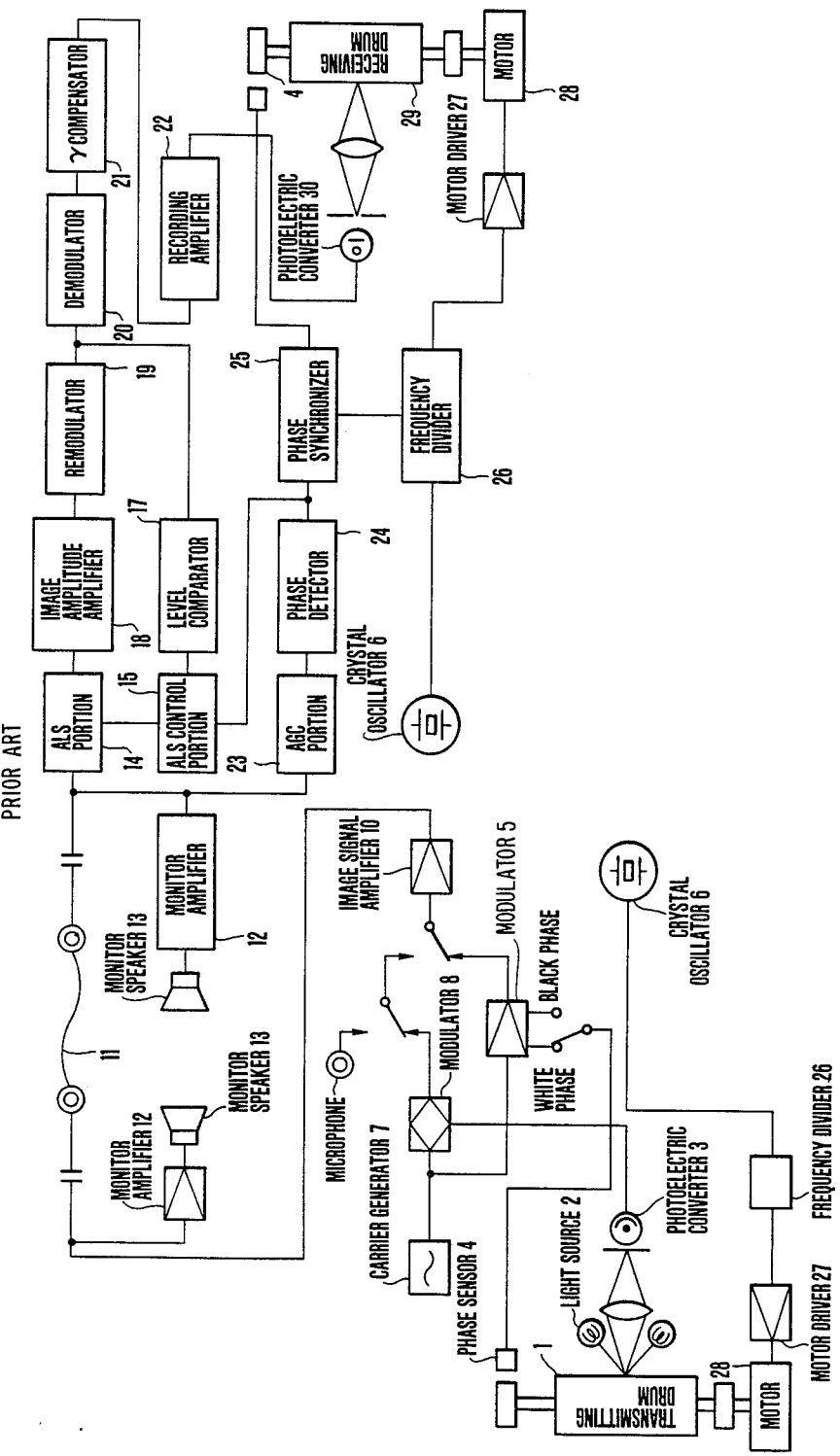
FIG. 4 shows a block diagram of an example of the construction of a conventional transmitting and receiving system.
Figure 5:
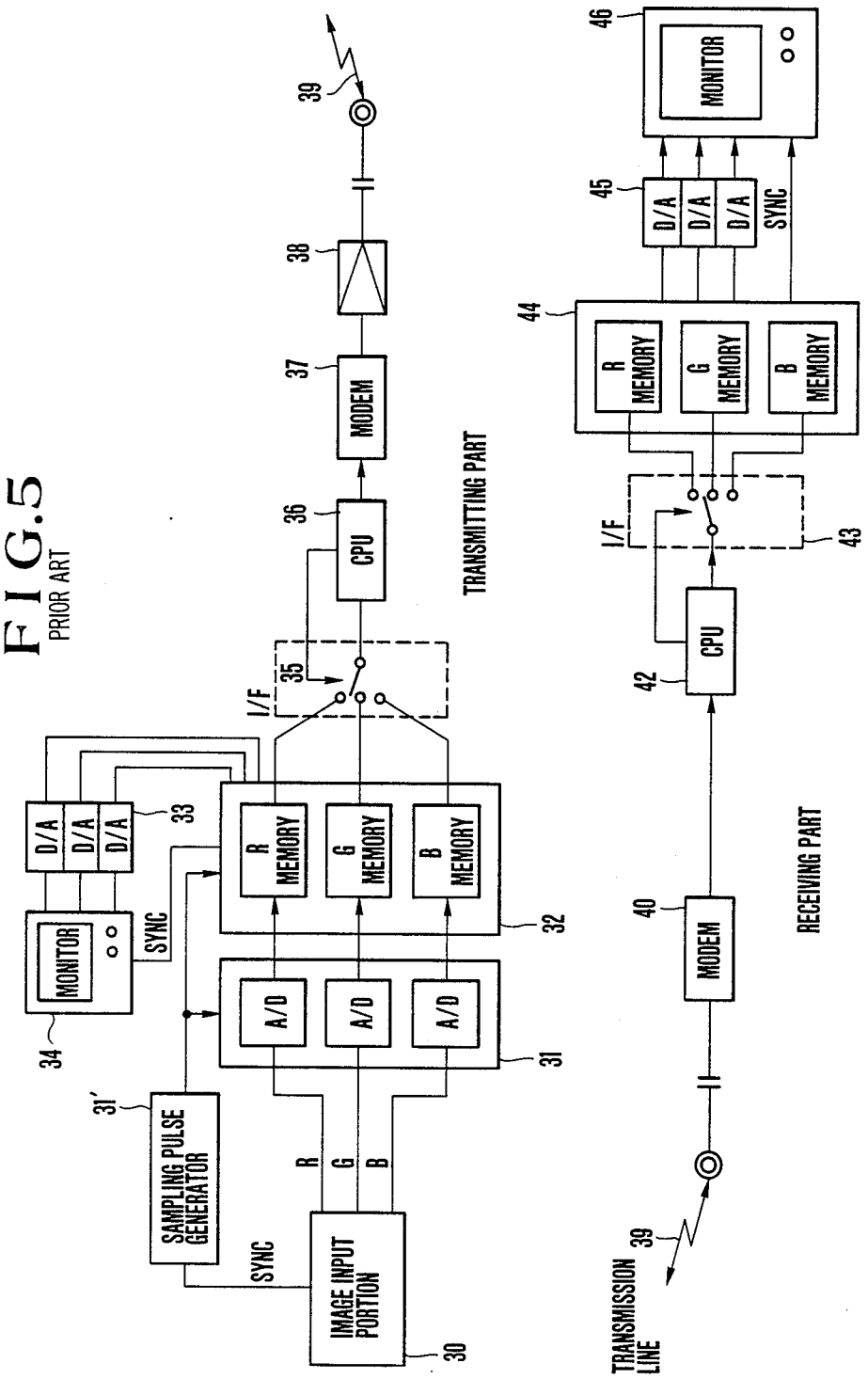
FIG. 5 shows a block diagram of example of the construction of a color transmitting receiving system according to the conventional MODEM transmission method.

As explained above, in the case of the embodiment shown in FIG. 1A, the start signal C shown in FIG. 2 is produced by the CPU 56 at the transmitting side, while in the case the start signal C is produced in the conventional system shown in FIG. 4, a line pattern in black and white is put at the left side of the origital picture as is shown in FIG. 3 so as to be read out and delivered by a photoelectric converting element. Thus delivered signal is received by the receiving part shown in FIG. 1A and processed in the same way as mentioned above.

Hereby, in the case of the embodiment shown in FIG. 3, two line patterns in black and white are provided in order to obtain the start signal, while in order to improve the fidelity it is possible to provide several line patterns continuously. In this way it is possible to transmit several bits of information after the start pattern so that the receiver can also be controlled at the transmitting side.

As explained above, in the case of the present embodiment the start pattern is sent before the delivery of the color information after the level adjustment and the phase matching when the color data are sent in a plane sequence so that the matching of the colors of the picture at the receiving side can be made easily and the color deviation can be avoided.

What is claimed is:

1. A color image transmitting and receiving system comprising:
   (A) a transmitting device including:
      (a) means for producing color image signals corresponding to a plural number of color components, the color image signals having an associated time axis;
      (b) changing means for changing the time axis of the color image signals produced by said producing means and, thereafter, transmitting said color image signals in a frame sequence;
      (c) means for adding a start signal to each color image signal at the time of the transmission by said changing means; and
   (B) a receiving device including:
      (a) storing means for receiving and storing the color image signals transmitted by said changing means;
      (b) means for making said storing means carry out the storing operation for each color image signal according to the respective start signal added to said color image signal; and
      (c) means for visually reproducing the signals stored in said storing means.

2. A system according to claim 1, wherein said system is used in conjunction with a recording means having an image signal including a plural number of color components recorded thereon and said producing means includes:
   (a) means for reading out the image signal recorded on said recording means; and
   (b) means for producing from the image signal color the image signals corresponding to the plural number of color components.

3. A system according to claim 1, wherein said changing means includes:
   (a) a plural number of memories each for receiving and storing a respective color image signal corresponding to a particular color component and from which the stored color image signal can be read out each memory having a storing speed at which the respective color image signal can be stored and a read-out speed at which the respective color image signal can be read out; and
   (b) control means for changing the time axis of the color image signals by causing the storing speed and the read-out speed of each of said plural number of memories to be different from each other.

4. A system according to claim 1, wherein said start signal is a combination of a signal associated with a maximum value of the color image signals and a signal associated with a minimum value of the color image signals.

5. A system according to claim 4, wherein said signal associated with the maximum value is a signal corresponding to a highlight point, while said signal associated with the minimum value is a signal corresponding to a shadow point.

6. A system according to claim 1, wherein said storing means includes a number of memories, the number corresponding to the number of color components, said number of memories storing the color image signals corresponding to the number of color components.

7. A system according to claim 6, wherein said reproducing means includes a monitor which visually reproduces said stored signals.

8. A system according to claim 7, wherein said reproducing means further includes control means for reading out the signals stored in said memories in a sequence corresponding to the reproduction of said stored signals by the monitor.

9. A transmitting device used for a color image transmitting and receiving system comprising:
   (a) producing means for producing color image signals corresponding to a plural number of color components, the color image signals having an associated time axis;
   (b) changing means for changing the time axis of the color image signals produced by said producing means and, thereafter, transmitting said color image signals in a frame sequence; and
   (c) means for adding a start signal to each color image signal transmitted by said changing means, the start signal added to each color signal being such as to control storage of the color image signal in a storage means of a receiving device.

10. A transmitting device according to claim 9, wherein said transmitting device is used in conjunction with a recording means having an image signal including a plural number of color components recorded thereon and said producing means includes:
   (a) means for reading out the image signal recorded on said recording means; and
   (b) means for converting the image signal into the color image signals corresponding to the plural number of color components.

11. A transmitting device according to claim 10, wherein said changing means includes:
   (a) a plural number of memories each for receiving and storing respective color image signal corresponding to a particular color component and from which the stored color image signal can be read out each memory having a storing speed at which the respective color image signal can be stored and a read-out speed at which the respective color image signal can be read out; and
   (b) control means for changing the time axis of the color image signals by causing the storing speed and the read-out speed of each of said plural number of memories to be different from each other.

12. A transmitting device according to claim 9, wherein said start signal is a combination of a signal associated with a maximum value of the color image signals and a signal associated with a minimum value of the color image signals.

13. A transmitting device according to claim 12, wherein said signal associated with the maximum value is a signal corresponding to a highlight point, while said signal associated with the minimum value is a signal corresponding to a shadow point.

14. A color image transmitting and receiving system comprising:
   (A) a transmitting device including:
      (a) means for producing color image signals corresponding to a plural number of color components; and
      (b) transmitting means for transmitting the color image signals produced by said producing means in a frame sequence, each frame corresponding to a particular color image signal and associated color component; and
      (c) means for adding a start signal to each color image signal at the time of the frame-sequential transmission of said color image signals; and
   (B) a receiving device including:
      (a) storing means for receiving and storing the color image signals transmitted by said transmitting means;
      (b) means for visually reproducing the color image signals; and
      (c) means for reading out the color image signals stored in said storing means in a dot sequence and delivering them to the visually reproducing means.

15. A color image transmitting and receiving system according to claim 14, wherein said producing means includes:
   (a) means for reading out an image signal recorded on a recording means; and
   (b) means for converting the image signal into the color image signals corresponding to the plural number of color components.

16. A color image transmitting and receiving system according to claim 14, wherein the color image signals have an associated time axis and the transmitting means changes the time axis of the color image signals.

17. A color image transmitting and receiving system according to claim 16, wherein said transmitting means includes:
   (a) a plural number of memories each for receiving and storing a respective color image signal corresponding to a particular color component and from which the color image signal can be read out each memory having a storing speed at which the respective color image signal can be stored and a read-out speed at which the respective color image signals be read out; and
   (b) control means for changing the time axis of the color image signals by causing the storing speed and the read-out speed of each of said plural number of memories to be different from each other.

18. A color image transmitting and receiving system according to claim 14, wherein said storing means includes a number of memories, the number corresponding to the number of color components, said number of memories storing the color image signals corresponding to the number of color components.

19. A color image transmitting and receiving system according to claim 14, wherein said visually reproducing means includes a monitor which visually reproduces the read-out signals.

20. An apparatus for receiving signals in which each of a plurality of color image signals corresponding to a plurality of color components is changed in time axis and transmitted together with a respective start signal in a frame sequence, comprising:
   (a) storing means for receiving and storing the transmitted color image signals;
   (b) means for making said storing means carry out the storing operation for each color image signal according to the respective start signal transmitted with each color signal; and
   (c) means for visually reproducing the signals stored in said storing means.

21. An apparatus according to claim 20, wherein said start signal is a combination of a signal associated with a maximum value of the color image signals and a signal associated with a minimum value of the color image signals.

22. An apparatus according to claim 21, wherein said signal associated with the maximum value is a signal corresponding to a highlight point, while said signal associated with the minimum value is a signal corresponding to a shadow point.

23. An apparatus according to claim 20, wherein said store means includes a plurality of memories, the plurality corresponding to the plurality of color components, said plurality of memories storing the plurality of color image signals corresponding to the plurality of color components.

24. An apparatus according to claim 23, wherein said visually reproducing means includes a monitor which visually reproduces said stored signals.

25. An apparatus according to claim 24, wherein said visually reproducing means further includes control means for reading out the signals stored in said memories in a sequence corresponding to the reproduction of said stored signals by the monitor.

* * * * *